United States Patent
Najjar et al.

(10) Patent No.: US 11,398,786 B2
(45) Date of Patent: *Jul. 26, 2022

(54) POWER TOOL WITH AUTOMATIC FEATHERING MODE

(71) Applicant: BLACK & DECKER INC., New Britain, CT (US)

(72) Inventors: Karim Najjar, Baltimore, MD (US); Tal Gottesman, Towson, MD (US); Scott M. Rudolph, Aberdeen, MD (US); Craig A. Schell, Street, MD (US); Paul G. Gross, White Marsh, MD (US)

(73) Assignee: Black & Decker Inc., New Britain, CT (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/825,032

(22) Filed: Mar. 20, 2020

(65) Prior Publication Data

US 2020/0220485 A1   Jul. 9, 2020

Related U.S. Application Data

(63) Continuation of application No. 14/680,114, filed on Apr. 7, 2015, now Pat. No. 10,637,379.

(51) Int. Cl.
| | |
|---|---|
| *H02P 6/28* | (2016.01) |
| *B25F 5/00* | (2006.01) |
| *B25B 21/00* | (2006.01) |
| *H01H 9/06* | (2006.01) |
| *H02P 7/22* | (2006.01) |

(52) U.S. Cl.
CPC .............. *H02P 6/28* (2016.02); *B25B 21/00* (2013.01); *B25F 5/00* (2013.01); *B25F 5/001* (2013.01); *H01H 9/061* (2013.01); *H02P 7/22* (2013.01)

(58) Field of Classification Search
CPC .... B25F 5/00; B25F 5/001; H02P 6/28; H02P 7/22; B25B 21/00; H01H 9/061
See application file for complete search history.

(56) References Cited

U.S. PATENT DOCUMENTS

| | | | | |
|---|---|---|---|---|
| 3,327,196 A | * | 6/1967 | Sahrbacker ............ | H01H 9/061 388/830 |
| 3,328,613 A | * | 6/1967 | Gawron ................. | H01H 9/061 310/48 |
| 3,379,851 A | * | 4/1968 | Weremey ............... | H01H 13/52 200/530 |

(Continued)

*Primary Examiner* — Robert F Long
*Assistant Examiner* — Eduardo R Ferrero
(74) *Attorney, Agent, or Firm* — Scott B. Markow

(57) ABSTRACT

A power tool includes a housing, a motor disposed in the housing, an output spindle configured to be driven by the motor, an input switch, and a controller configured to control power being delivered to the motor. The controller is operable in one of: (a) a normal mode where the controller causes continuous electric power to be delivered to the motor during actuation of the input switch in a first range of positions; and (b) a feathering mode where the controller causes discontinuous electric power to be delivered to the motor during actuation of the input switch in a second range of positions that is different from the first range of positions motor to simulate feathering the input switch.

20 Claims, 12 Drawing Sheets

(56) References Cited

U.S. PATENT DOCUMENTS

| | | | | |
|---|---|---|---|---|
| 3,447,057 | A * | 5/1969 | Brown | H02M 5/2573 388/838 |
| 3,484,632 | A * | 12/1969 | Opalenik | H01H 9/061 310/68 R |
| 3,590,194 | A * | 6/1971 | Frenzel | H01H 1/403 200/522 |
| 3,594,523 | A * | 7/1971 | Frenzel | H01H 13/08 200/243 |
| 3,919,505 | A * | 11/1975 | Becker | H01H 13/62 200/5 R |
| 3,920,088 | A * | 11/1975 | Dudek | B25B 23/1456 173/169 |
| 3,961,146 | A * | 6/1976 | Dummer | H01H 13/08 200/522 |
| 4,097,791 | A * | 6/1978 | Bivens | H02P 1/026 318/484 |
| 4,136,308 | A * | 1/1979 | King | H02P 8/14 318/400.23 |
| 4,137,490 | A * | 1/1979 | Brozoski | H01H 9/061 388/830 |
| 4,200,781 | A * | 4/1980 | Dummer | H01H 13/04 200/303 |
| RE30,270 | E * | 5/1980 | Fiber | H01H 9/06 200/43.17 |
| 4,206,333 | A * | 6/1980 | Savas | H01H 13/08 200/1 B |
| 4,241,298 | A * | 12/1980 | Trammell, Jr | H01H 9/061 200/1 A |
| 4,273,198 | A * | 6/1981 | Doniwa | B25B 23/147 173/1 |
| 4,286,125 | A * | 8/1981 | Schaffeler | H01H 15/102 200/522 |
| 4,554,980 | A * | 11/1985 | Doniwa | B25B 23/147 173/176 |
| 4,649,245 | A * | 3/1987 | Lessig, III | H01H 9/061 200/327 |
| 4,667,119 | A * | 5/1987 | Holmes | H01H 13/08 307/326 |
| 4,820,889 | A * | 4/1989 | Seghetti | H01H 9/06 200/1 B |
| 5,061,885 | A * | 10/1991 | Fukuhara | B25B 23/14 318/434 |
| 5,289,885 | A * | 3/1994 | Sakoh | B25B 23/1405 173/109 |
| 5,440,215 | A * | 8/1995 | Gilmore | B23P 19/066 173/178 |
| 5,450,988 | A * | 9/1995 | Jerdee | B05C 17/0103 222/333 |
| 5,526,460 | A * | 6/1996 | DeFrancesco | B25B 23/1475 388/831 |
| 6,288,352 | B1 * | 9/2001 | Fukui | H01H 13/506 200/1 R |
| 6,414,459 | B1 * | 7/2002 | Borho | H03K 7/08 318/599 |
| 6,598,684 | B2 * | 7/2003 | Watanabe | B25B 21/02 173/176 |
| 6,687,567 | B2 * | 2/2004 | Watanabe | B25B 23/1405 700/168 |
| 7,062,979 | B2 * | 6/2006 | Day | B25B 23/147 73/862.22 |
| 7,137,541 | B2 * | 11/2006 | Baskar | B25C 1/06 227/120 |
| 7,138,595 | B2 * | 11/2006 | Berry | B25C 1/008 200/522 |
| 7,297,891 | B2 * | 11/2007 | Omori | H01H 3/48 200/522 |
| 7,307,230 | B2 * | 12/2007 | Chen | B25B 21/00 200/332.2 |
| 7,467,669 | B2 * | 12/2008 | Friberg | B25B 23/1453 173/1 |
| 7,595,601 | B2 * | 9/2009 | Kushida | B25B 21/00 318/431 |
| 7,638,725 | B2 * | 12/2009 | Aoki | H01H 9/063 200/332.2 |
| 8,410,387 | B2 * | 4/2013 | Niklewski | H01H 9/061 200/522 |
| 8,657,030 | B2 * | 2/2014 | Du | B25B 21/00 173/176 |
| 8,689,900 | B2 * | 4/2014 | Miwa | B25F 5/001 173/176 |
| 8,796,976 | B2 * | 8/2014 | Kusakawa | B25B 21/00 318/477 |
| 8,988,015 | B2 * | 3/2015 | Forster | G01R 31/3835 318/3 |
| 9,314,908 | B2 * | 4/2016 | Tanimoto | B25B 21/02 |
| 9,707,671 | B2 * | 7/2017 | Shi | H02P 29/032 |
| 10,637,379 | B2 * | 4/2020 | Najjar | B25B 21/00 |
| 2003/0090227 | A1 * | 5/2003 | Ito | B25B 23/1405 318/434 |
| 2004/0182588 | A1 * | 9/2004 | Tokunaga | B25B 23/1475 173/2 |
| 2005/0205274 | A1 * | 9/2005 | Bogue | B25B 21/02 173/2 |
| 2005/0263303 | A1 * | 12/2005 | Shimizu | B25B 23/1475 173/2 |
| 2005/0263304 | A1 * | 12/2005 | Sainomoto | B25B 21/026 173/2 |
| 2006/0137887 | A1 * | 6/2006 | Ohtsu | B25B 21/026 173/2 |
| 2006/0237297 | A1 * | 10/2006 | Xu | H01H 9/063 200/522 |
| 2007/0034394 | A1 * | 2/2007 | Gass | B25H 1/0092 173/2 |
| 2007/0108035 | A1 * | 5/2007 | Broghammer | B25F 5/00 200/522 |
| 2007/0144752 | A1 * | 6/2007 | Pozgay | B25B 21/00 173/216 |
| 2008/0297080 | A1 * | 12/2008 | Bosch | B25B 21/008 318/400.09 |
| 2008/0314721 | A1 * | 12/2008 | Arataki | H01H 9/061 200/17 B |
| 2009/0026058 | A1 * | 1/2009 | Knuppel | H01H 3/20 200/522 |
| 2010/0200260 | A1 * | 8/2010 | Mikami | B25B 21/00 173/176 |
| 2010/0308764 | A1 * | 12/2010 | Suzuki | H02P 29/032 318/494 |
| 2011/0057584 | A1 * | 3/2011 | Nishikimi | H01H 9/061 318/17 |
| 2012/0293099 | A1 * | 11/2012 | Velderman | H02K 7/145 318/400.18 |
| 2013/0008679 | A1 * | 1/2013 | Nishikawa | B25B 21/02 173/93 |
| 2013/0062086 | A1 * | 3/2013 | Ito | B25B 23/1405 173/1 |
| 2013/0068491 | A1 * | 3/2013 | Kusakawa | B25B 21/00 173/176 |
| 2013/0126202 | A1 * | 5/2013 | Oomori | B25B 21/00 173/217 |
| 2013/0193891 | A1 * | 8/2013 | Wood | H02P 6/08 318/434 |
| 2014/0231111 | A1 * | 8/2014 | Lehnert | B25F 5/005 173/1 |
| 2014/0374130 | A1 * | 12/2014 | Nakamura | B25D 11/00 173/176 |
| 2015/0256111 | A1 * | 9/2015 | Forster | H02P 6/15 318/400.22 |
| 2015/0279592 | A1 * | 10/2015 | Ekstrom | B23Q 5/041 200/522 |
| 2015/0282822 | A1 * | 10/2015 | Trees | A61B 18/1445 606/41 |

\* cited by examiner

POWER TOOL WITH AUTOMATIC FEATHERING MODE

RELATED APPLICATION

This application is a continuation of U.S. patent application Ser. No. 14/680,114, filed Apr. 7, 2015, titled "Power Tool with Automatic Feathering Mode," which is incorporated by reference.

TECHNICAL FIELD

This application relates to a power tool, such as a drill, drill/driver, hammer drill, screwdriver, or impact driver, with an automatic feathering mode of operation.

BACKGROUND

A power tool, such as a drill, drill/driver, hammer drill, screwdriver, or impact driver, may be used for driving a fastener such as a threaded screw or nut into a workpiece. Often, towards the end of such a fastening operation, the user will feather the input switch by quickly pulling and releasing the input switch. This causes short pulses of discontinuous power to be applied to the motor, which allows the fastener to be driven in small increments to avoid stripping the fastener or damaging a workpiece. However, this type of manual feathering of the input switch can cause user fatigue and damage to the input switch.

SUMMARY

In an aspect, this application discloses a method of operating a power tool coupled to a source of electric power and having a motor, a controller, and an input switch. The method includes determining a position of the input switch that is moveable between a deactivated position and an actuated position, delivering continuous electric power to the motor when the determined position of the input switch is within a first range of positions, the continuous electric power causing continuous rotation of the motor, and delivering discontinuous electric power to the motor when the determined position of the input switch is within a second range of positions that is different from the first range of positions, the discontinuous power causing discontinuous rotation of the motor to simulate feathering the input switch.

Implementations of this aspect may include one or more of the following features. The continuous electric power may comprise a pulse-width modulated control signal delivered to the motor. The discontinuous electric power may comprise pulses of electrical power with a frequency low enough to be perceptible to a user. Each pulse of electrical power in the discontinuous electric power may comprise a pulse-width-modulated signal. The pulses of electric power comprise pulses of a first intermediate power interrupted by pulses of a second intermediate power that is different than the first intermediate power. The pulses of electric power comprise pulses of power interrupted by pulses of zero power.

The first range of positions may be between the deactivated position and a first intermediate position, the first intermediate position being between the deactivated position and the actuated position. The first range of positions may include a first subrange of positions between the deactivated position and a second intermediate position and a second subrange of positions between the second intermediate position and the first intermediate position, with the second intermediate position between the deactivated position and the first intermediate position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

The first range of positions may be between the deactivated position and the actuated position and the second range of positions may be between an intermediate position and the deactivated position, the intermediate position being between the deactivated position and the actuated position. Discontinuous electric power may be delivered to the motor only if the determined position of the input switch is in the second range after being in a position between the intermediate position and the actuated position. The first range of positions comprises a first subrange of positions may be between the deactivated position and the intermediate position and a second subrange of positions may be between the intermediate position and the actuated position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

In another aspect, a power tool includes a housing, a motor disposed in the housing, an output spindle configured to be driven by the motor, an input switch, and a controller configured to control power being delivered to the motor. The controller is operable in one of: (a) a normal mode where the controller causes continuous electric power to be delivered to the motor during actuation of the input switch in a first range of positions; and (b) a feathering mode where the controller causes discontinuous electric power to be delivered to the motor during actuation of the input switch in a second range of positions that is different from the first range of positions motor to simulate feathering the input switch.

Implementations of this aspect may include one or more of the following features. The continuous electric power may comprise a pulse-width modulated control signal delivered to the motor. The discontinuous electric power may comprise pulses of electrical power with a frequency low enough to be perceptible to a user. Each pulse of electrical power in the discontinuous electric power may comprise a pulse-width-modulated signal. The pulses of electric power comprise pulses of a first intermediate power interrupted by pulses of a second intermediate power that is different than the first intermediate power. The pulses of electric power comprise pulses of power interrupted by pulses of zero power.

The first range of positions may be between the deactivated position and a first intermediate position, the first intermediate position being between the deactivated position and the actuated position. The first range of positions may include a first subrange of positions between the deactivated position and a second intermediate position and a second subrange of positions between the second intermediate position and the first intermediate position, with the second intermediate position between the deactivated position and the first intermediate position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

The first range of positions may be between the deactivated position and the actuated position and the second range of positions may be between an intermediate position and the deactivated position, the intermediate position being between the deactivated position and the actuated position. Discontinuous electric power may be delivered to the motor only if the determined position of the input switch is in the second range after being in a position between the intermediate position and the actuated position. The first range of positions comprises a first subrange of positions may be between the deactivated position and the intermediate position and a second subrange of positions may be between the intermediate position and the actuated position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

A first biasing element may bias the input switch toward the deactivated position during actuation of the input switch in the first and second ranges of positions. A second biasing element may engage the input switch at an intermediate position between the first range of positions and the second range of positions to provide additional biasing force against the input switch. The second biasing element may include a biased detent that engages the input switch at the intermediate position such that additional force is needed to actuate the input switch past the intermediate position from the first range of positions to the second range of positions. The second biasing element may include a biased lever that engages the input switch through the second range of positions such that additional force is needed to actuate the input switch in the second range of positions than in the first range of positions.

In another aspect, a control unit is disclosed for a power tool having a motor and an input switch and couplable to a source of electric power. The control unit includes a controller configured to determine a position of the input switch between a deactivated position and an actuated position. Based on the position of the input switch, the controller is configured to control delivery of electric power to the motor in one of: (a) a normal mode where the controller causes continuous electric power to be delivered to the motor during actuation of the input switch in a first range of positions; and (b) a feathering mode where the controller causes discontinuous electric power to be delivered to the motor during actuation of the input switch in a second range of positions that is different from the first range of positions motor to simulate feathering the input switch.

Implementations of this aspect may include one or more of the following features. The control unit may further include a motor control circuit coupled to the controller, to the source of electric power and to the motor. The continuous electric power may comprise a pulse-width modulated control signal delivered to the motor. The discontinuous electric power may comprise pulses of electrical power with a frequency low enough to be perceptible to a user. Each pulse of electrical power in the discontinuous electric power may comprise a pulse-width-modulated signal. The pulses of electric power comprise pulses of a first intermediate power interrupted by pulses of a second intermediate power that is different than the first intermediate power. The pulses of electric power comprise pulses of power interrupted by pulses of zero power.

The first range of positions may be between the deactivated position and a first intermediate position, the first intermediate position being between the deactivated position and the actuated position. The first range of positions may include a first subrange of positions between the deactivated position and a second intermediate position and a second subrange of positions between the second intermediate position and the first intermediate position, with the second intermediate position between the deactivated position and the first intermediate position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

The first range of positions may be between the deactivated position and the actuated position and the second range of positions may be between an intermediate position and the deactivated position, the intermediate position being between the deactivated position and the actuated position. Discontinuous electric power may be delivered to the motor only if the determined position of the input switch is in the second range after being in a position between the intermediate position and the actuated position. The first range of positions comprises a first subrange of positions may be between the deactivated position and the intermediate position and a second subrange of positions may be between the intermediate position and the actuated position. Delivering continuous electric power may include delivering a variable amount of electric power when the input switch is within the first subrange, and delivering a constant amount of electric power when the input switch is within the second subrange. The variable amount of electric power may be a function of a position of the input switch. The constant amount of electric power may be a maximum electric power.

Advantages may include one or more of the following. For example, the tool may provide a more controlled automatic feathering mode that can be used at the end of a fastening operation. In addition, the automatic feathering mode may result in less user fatigue, may reduce damage to sensitive electronic and mechanical components in the input switch, and may increase input switch reliability and lifespan by reducing cycles of actuating the input switch. These and other advantages and features will be apparent from the description, the drawings, and the claims.

DETAILED DESCRIPTION

Figure 1:
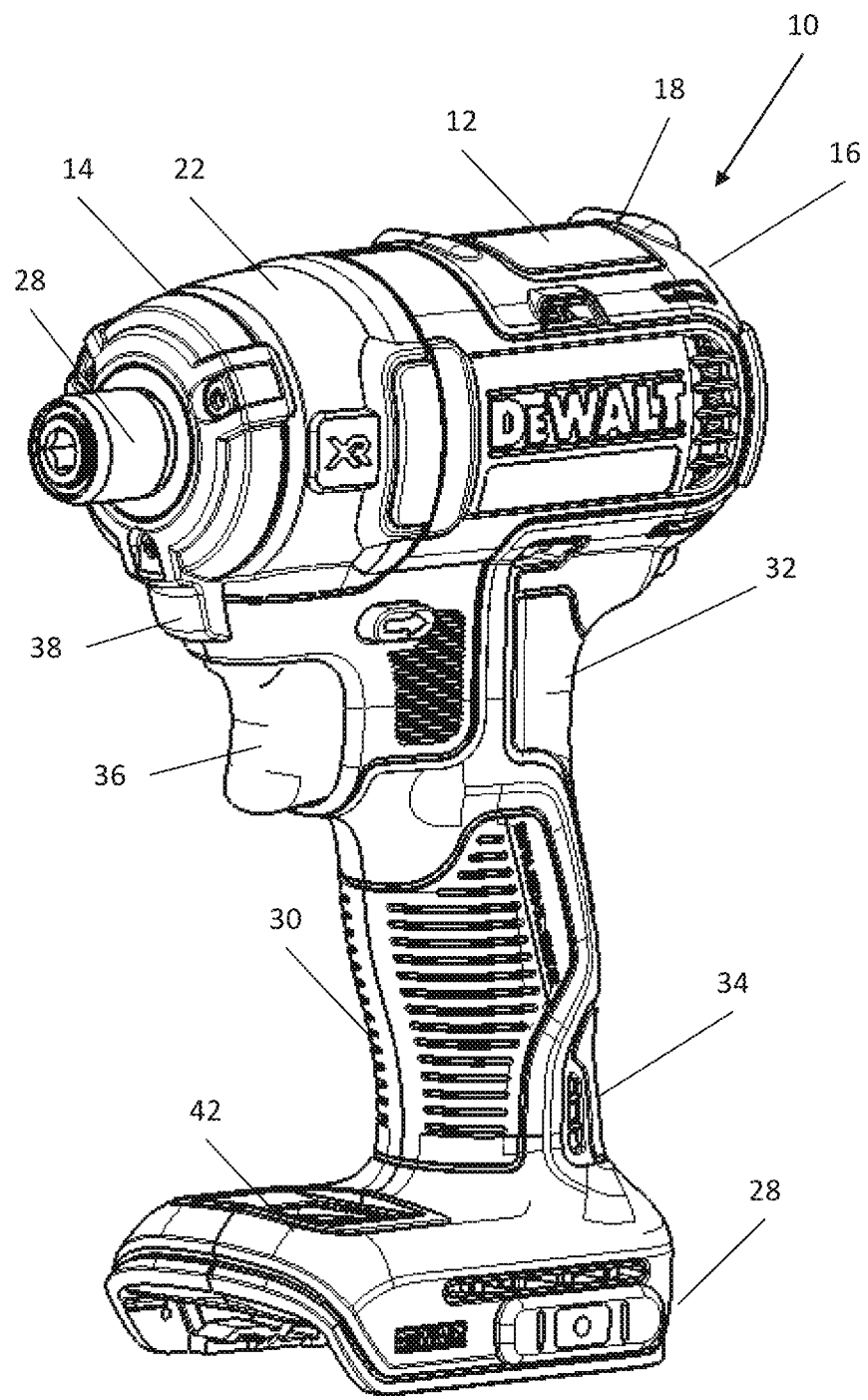
FIG. 1 is a perspective view of an embodiment of a power tool.
Figure 2:
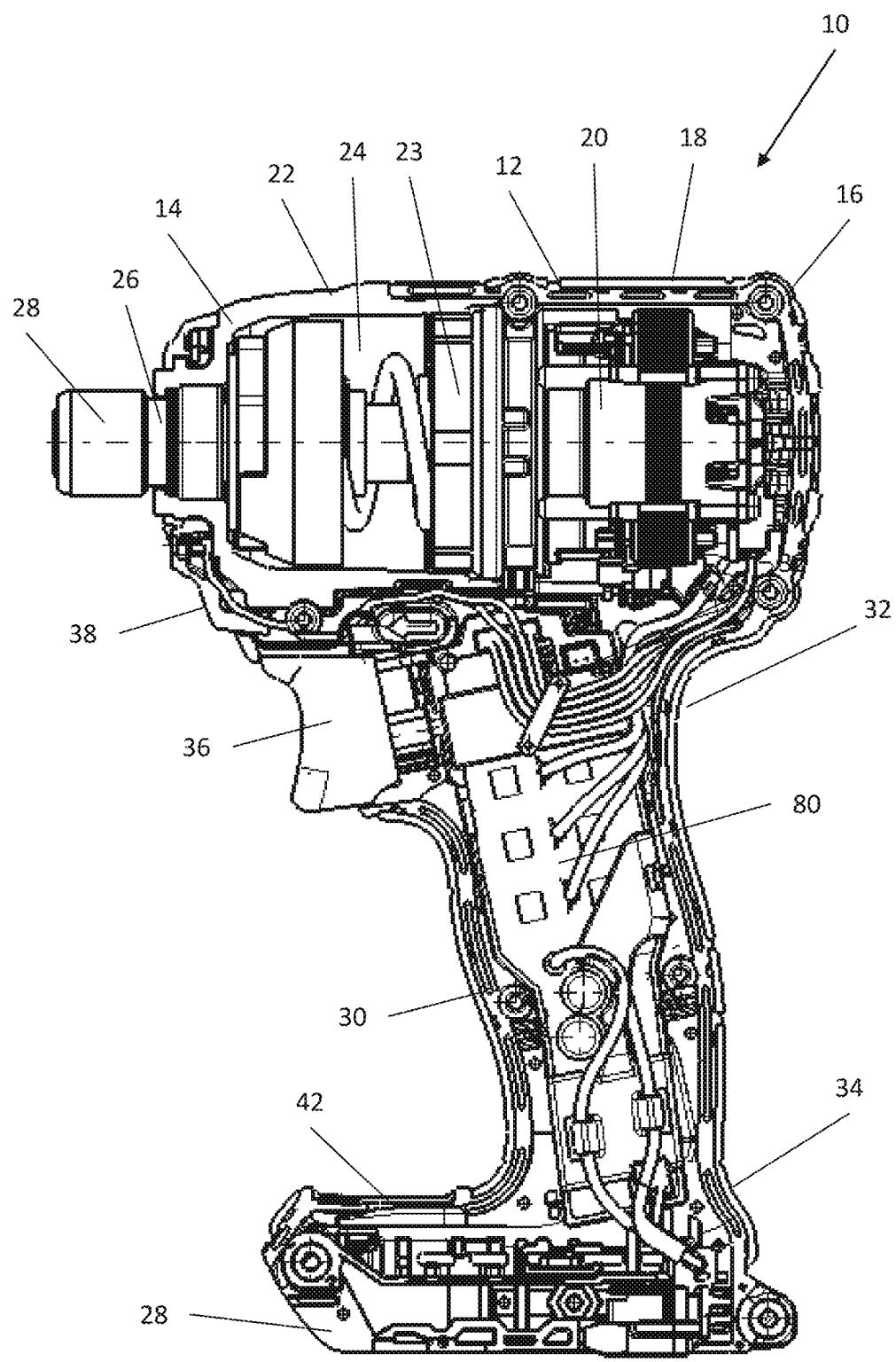
FIG. 2 is a side view of the power tool of FIG. 1 with a portion of the housing removed.

Referring to FIGS. 1 and 2, in an embodiment, a power tool 10, such as a drill, drill/driver, hammer drill, screwdriver, or impact driver, has a housing 12 having a front end portion 14 and a rear end portion 16. The housing 12 includes a motor housing portion 18 that contains an electric motor 20 and a transmission housing portion 22 that contains a transmission 23. In the disclosed embodiment, the power tool 10 is an impact driver and the transmission housing portion 22 also contains an impact mechanism 24. The transmission 23 and impact mechanism 24 transmit rotary motion from the motor 20 to an output spindle 26. Further details regarding an exemplary transmission and impact mechanism can be found in commonly-owned U.S. patent application Ser. No. 14/633,211, filed Feb. 27, 2015, which is incorporated by reference. Coupled to the output spindle 26 is a tool holder 28 for retaining a tool bit (e.g., a screwdriving bit, not shown). The output spindle 26 and the tool holder 28 together define and extend along a tool axis X-X. As shown, the tool holder 28 includes a hex bit retention mechanism. Further details regarding exemplary tool holders are set forth in commonly-owned U.S. patent application Ser. No. 12/394,426, which is incorporated herein by reference.

Extending downward and slightly rearward of the housing 12 is a handle 30 in a pistol grip formation. The handle 30 has a proximal portion 32 coupled to the housing 12 and a distal portion 34 coupled to a battery receptacle 28. The motor 20 may be powered by an electrical power source 44 (see FIG. 3), such as AC mains or a DC battery pack that is coupled to the battery receptacle 28. A multi-positionable input switch 36 is coupled to the handle 30 adjacent the housing 12. The input switch 36 enables the user to control delivery of power from the electrical power source to the motor 20, as described in greater detail below. A light unit (e.g., an LED) 38 may be disposed on the front end portion 14 of the housing 12, just below the tool holder 28 to illuminate an area in front of the tool holder 28. Power delivery to the light unit 38 may be controlled by the trigger 36 and the controller 40, or by a separate switch on the tool. Coupled to the top of the battery receptacle 28 is a speed selector switch 42, which provides an input to the controller 40. The speed selector switch 42 allows the user to select among a plurality of maximum motor speeds. For example, in one possible embodiment the speed selector switch 42 may have three positions—low speed, medium speed, and high speed with the normal mode.

Figure 3:
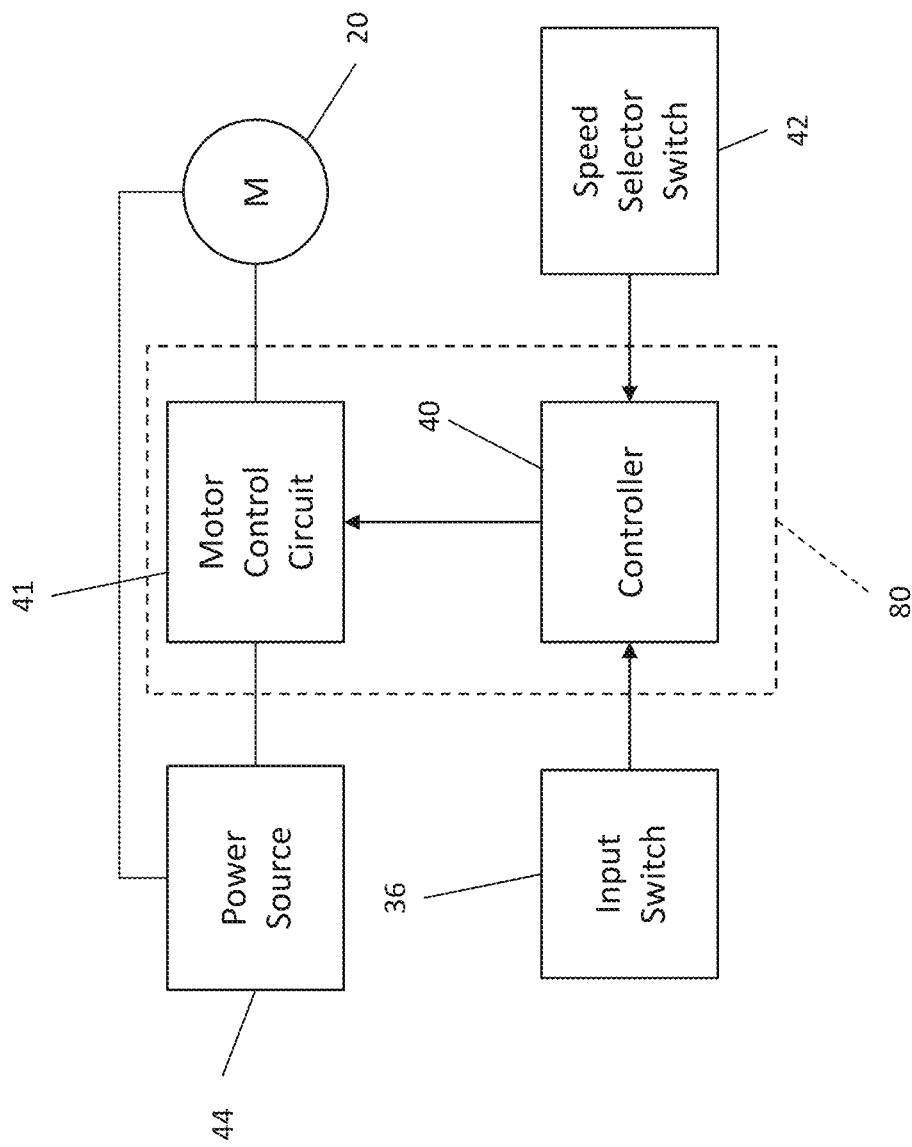
FIG. 3 is a schematic view of electronic controls for the power tool.

Referring also to FIG. 3, the power source 44 is electrically coupled to the motor 20 via a motor control circuit 41. The motor control circuit 41 may include any number of well known motor control circuits, such as an H-bridge driver circuit, a half-bridge driver circuit, a PWM control circuit, or a brushless motor control circuit. The input switch 36 and the speed selector switch 42 are coupled to and provide inputs to a controller 40. The controller 40 may include any number of well known control circuits such as an analog control circuit, a digital control circuit, a processor, a microprocessor, a microcontroller, or an integrated circuit. The controller 40 has an output that is configured to control operation of the motor control circuit 41. In some embodiments, the controller 40 and the motor control circuit 41 may be integrated together in a single control unit 80 (see also FIG. 2).

The input switch 36 is moveable, by being depressed by a user's finger, among a range of positions between a deactivated position P0 where the switch is not depressed at all and a fully depressed position Pmax where the switch is depressed to its maximum extent. The controller 40 receives an input signal corresponding to the position P of the switch 36, e.g., via a position sensor such as a Hall sensor or via a voltage signal from the switch 36 (not shown). Based on the input position signal from the input switch 36, the controller 40 controls the amount of power being delivered to the motor 20. Power may be controlled by directly or indirectly by controlling one or more parameters or analogues of power, such as current, voltage, resistance, duty cycle of a pulse-width-modulation (PWM) signal, motor speed, and/or torque. As used in this application, controlling power refers to any means of directly controlling power or indirectly controlling power by controlling these or other parameters or analogues of power.

The controller 40 is operable in a "normal mode" when the input switch 36 is actuated over a first range of positions, and is operable in an "automatic feathering mode" when the input switch 36 is actuated over a second range of positions. In the normal mode, the controller delivers continuous electrical power to the motor to cause continuous rotation of the motor. Such continuous electric power may be delivered in the form of a continuous AC signal, a continuous DC signal, a continuous pulse-width-modulation (PWM) signal with a sufficiently high frequency to enables continuous rotation of the motor (according to techniques known to those of ordinary skill in the art), or a brushless motor control signal. In the example of a PWM signal, the frequency of a PWM signal that enables continuous rotation of the motor may be approximately 4 kHz to approximately 100 kHz.

In the automatic feathering mode, the controller delivers discontinuous pulses of electrical power to the motor to cause discontinuous rotation of the motor, at a low enough frequency so that the individual pulses are perceptible to the user. This discontinuous power comprises pulses of higher electrical power interrupted by pulses of lower or zero power, with a low enough frequency so that the individual pulses are perceptible to the user. Each pulse of higher electric power may comprise a continuous AC signal, a continuous DC signal, a pulse-width-modulation (PWM) signal with the pulses of the PWM signal being of a sufficiently high frequency to cause continuous rotation of the motor during that pulse of the PWM signal, or a brushless motor control signal. For example, the frequency of the pulses of power may be approximately 1 Hz to approximately 100 Hz. In another example, the frequency of the pulses in the automatic feathering mode may be approximately 100 times to 1000 times less than the frequency of of PWM within each of the pulses or in the normal mode. The automatic feathering mode simulates the user feathering the input switch by rapidly activating and deactivating the input switch.

Figure 4:
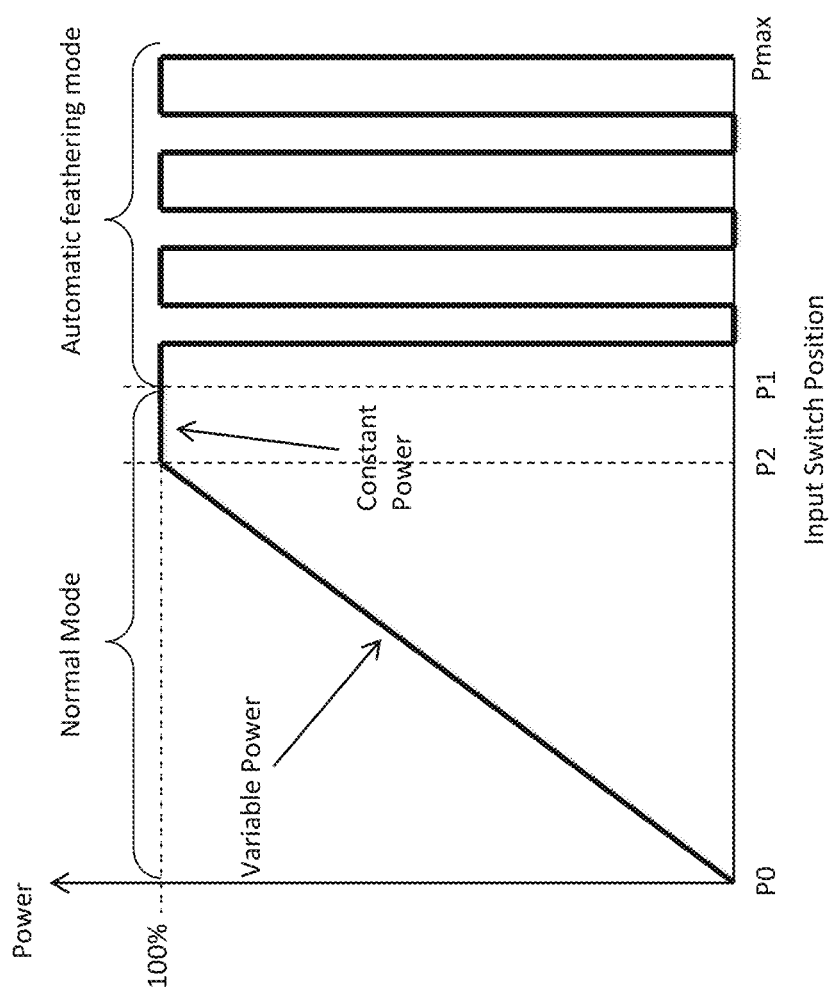
FIG. 4 is a graph showing operation of the power tool in a first embodiment of a normal mode and an automatic feathering mode.

Referring to FIG. 4, in one embodiment, the controller 40 is operable in a normal mode when the input switch 36 is actuated in a first range of positions between a deactivated position P0 and a first intermediate position P1, and in an automatic feathering mode when the input switch 36 is actuated in a second range of positions between the first intermediate position P1 and a fully actuated position Pmax. In the normal mode, the controller 40 causes continuous electrical power to be delivered to the motor to cause continuous rotation of the motor. The first range of positions P0-P1 for the normal mode contains into two sub-ranges of positions. First, when the input switch is actuated a first sub-range between the deactivated position P0 and a second intermediate position P2 (which is closer to the deactivated position P0 than the first intermediate position P1), the amount of continuous power delivered to the motor is proportional to the distance of input switch travel from the deactivated position P0. This can be achieved, for example, by varying the duty cycle of a PWM signal. The duty cycle is expressed as a percentage of the amount of on-time for a given cycle of the PWM signal, with 100% duty cycle being a constant DC signal. It should be understood that, in the first sub-range, the relationship between the amount of power and the input switch position may be something different than proportional relationship, such as a logarithmic relationship (e.g., power=$A*\log_n(\text{position})+B$), an exponential relationship (e.g., power=$A*\text{position}^n+B$), or a higher order polynomial function. Second, when the input switch actuated in a second sub-range between the second intermediate position P2 and the first intermediate position P1, the amount of continuous power delivered to the motor is constant. For example, the controller 40 may provide full power (e.g., a duty cycle of 100%) to the motor. It should be understood that the normal mode may include only a variable speed portion with no full power portion, or may include only a full power portion with no variable speed portion.

In the automatic feathering mode, when the input switch is actuated in the second range of positions between the first intermediate position P1 and the position of maximum actuation Pmax, the controller causes discontinuous pulses of electrical power to be delivered to the motor to cause discontinuous rotation of the motor. In the automatic feathering mode, the controller 40 applies pulses of continuous power interrupted by pulses of zero power to the motor so that the motor rotates in small increments. As discussed above, the frequency of pulses is low enough to be perceptible to the user, such as approximately 1 Hz to approximately 100 Hz. This pulsing of power simulates feathering the input switch.

Figure 5:
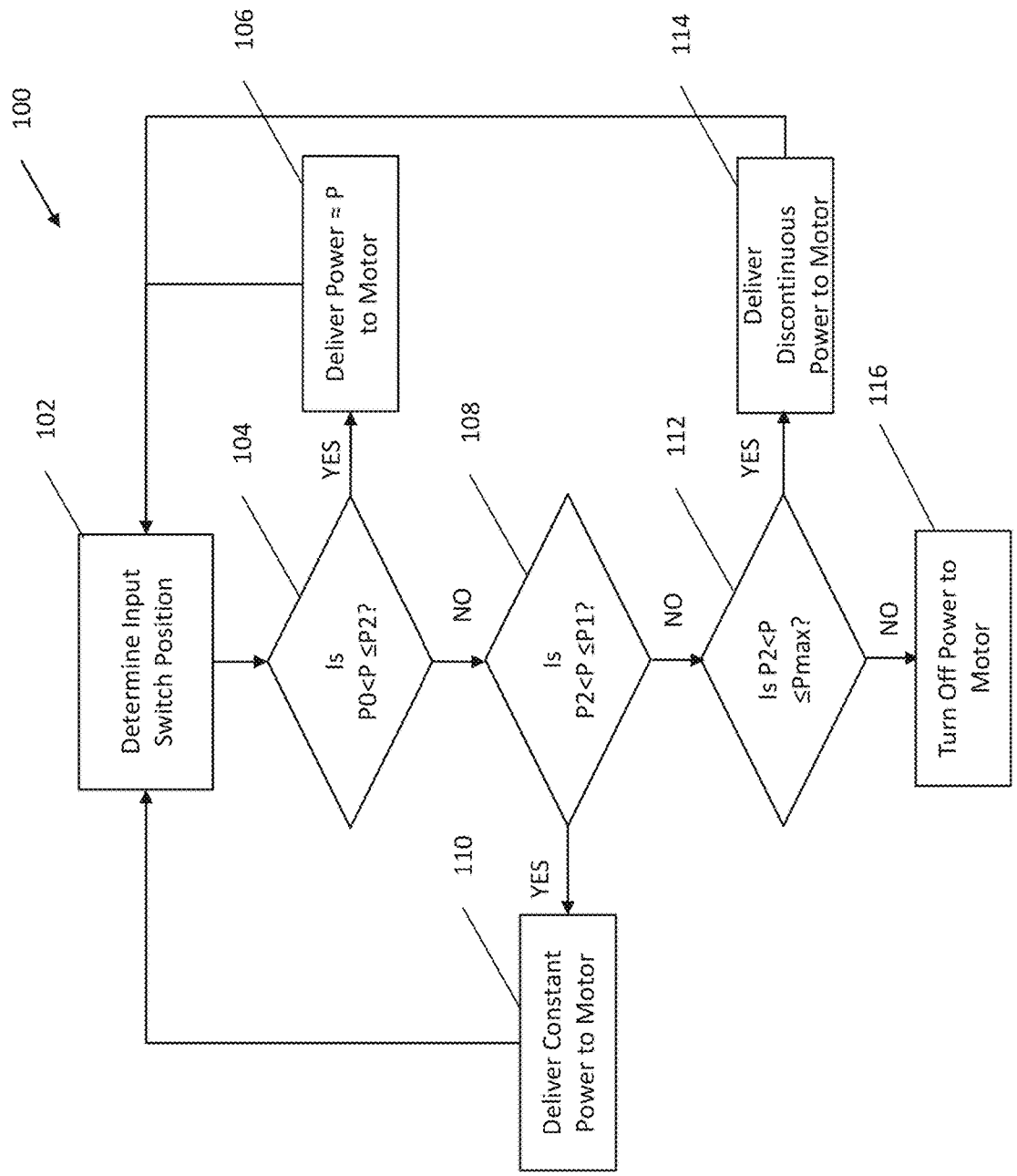
FIG. 5 is a flow chart showing operation of the power tool in the first embodiment of the normal mode and the automatic feathering mode of FIG. 4.
Figure 6:
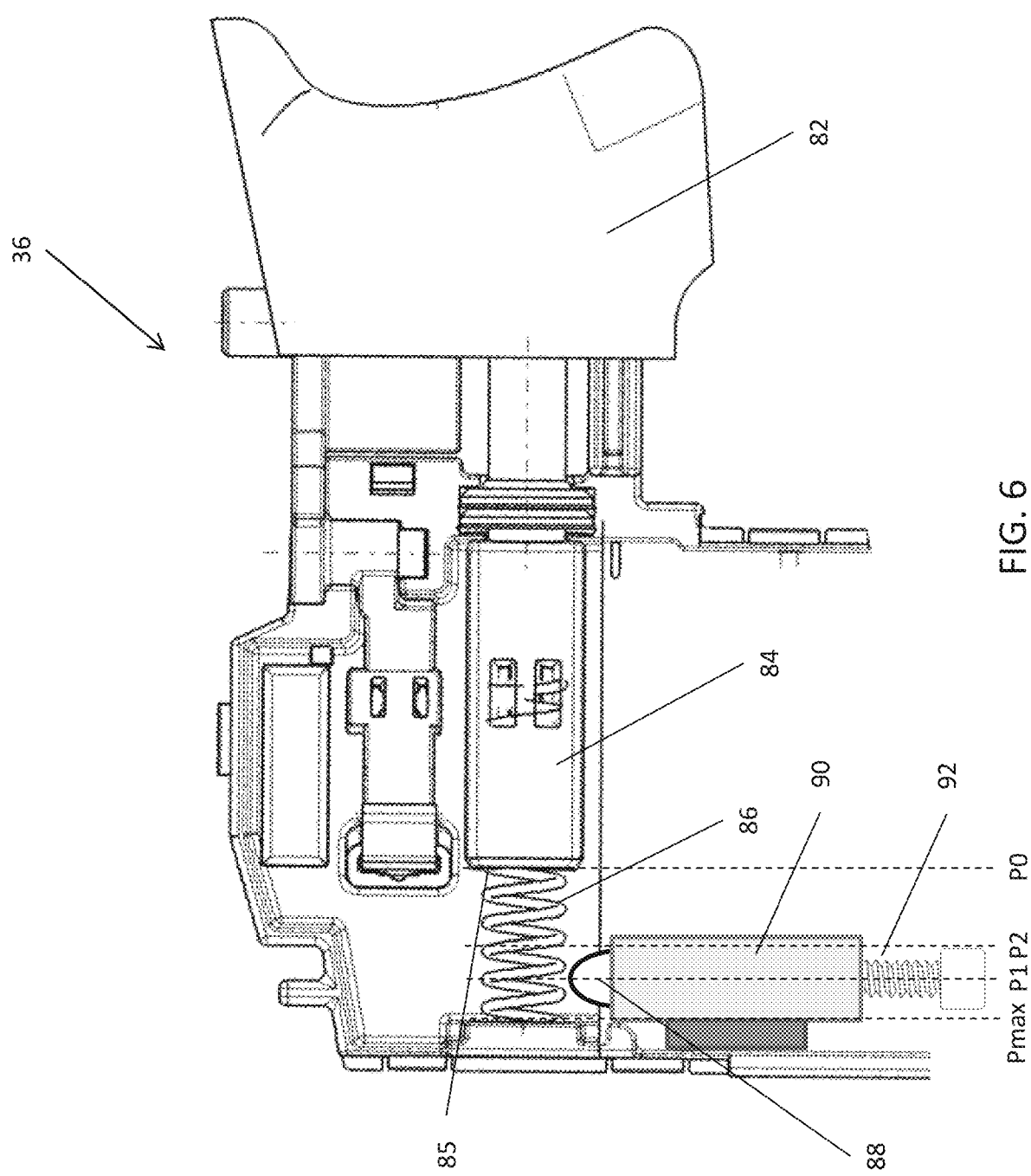
FIG. 6 is side view of a first embodiment of an input switch for implementing the first embodiment of the normal mode and the automatic feathering mode of FIG. 4.

FIG. 6 illustrates an exemplary process 100 that may be implemented by the controller 40 to achieve the operation of the embodiment of FIG. 5. At step 102, the controller detects the position P of the input switch. At step 104, the controller determines whether the position P of the input switch is in the first subrange of the first range of positions for operation of the controller in the normal mode with variable power (i.e., between the deactivated position P0 and the second intermediate position P2). If P is within this first subrange, then at step 106, the controller controls the power proportional to the position P of the input switch, and then returns to step 102 to detect the input switch position. If P is not within this first subrange, then at step 108, the controller determines whether the position P of the input switch is within the second subrange of the first range of positions for operation of the controller in the normal mode with constant power (i.e., between the second intermediate position P2 and the first intermediate position P1). If P is within this second subrange, then at step 110, the controller delivers constant power to the motor (e.g., at the maximum 100% PWM duty cycle), and then returns to step 102 to detect the trigger switch position. If P is not within this second subrange, then at step 112, the controller determines whether the position P of the input switch is within the second range corresponding to the automatic feathering mode of operation (i.e., between the first intermediate position P1 and the full actuated position Pmax). If P is within this second range, then, the controller applies discontinuous power to the motor sufficient to cause discontinuous rotation of the motor (e.g., pulses of maximum power interrupted by pulses of zero power). If P is not within this second range, this means that the input switch has been deactivated or that there is an error in the system, and step 116, the controller turns off power being delivered to the motor.

Figure 7:
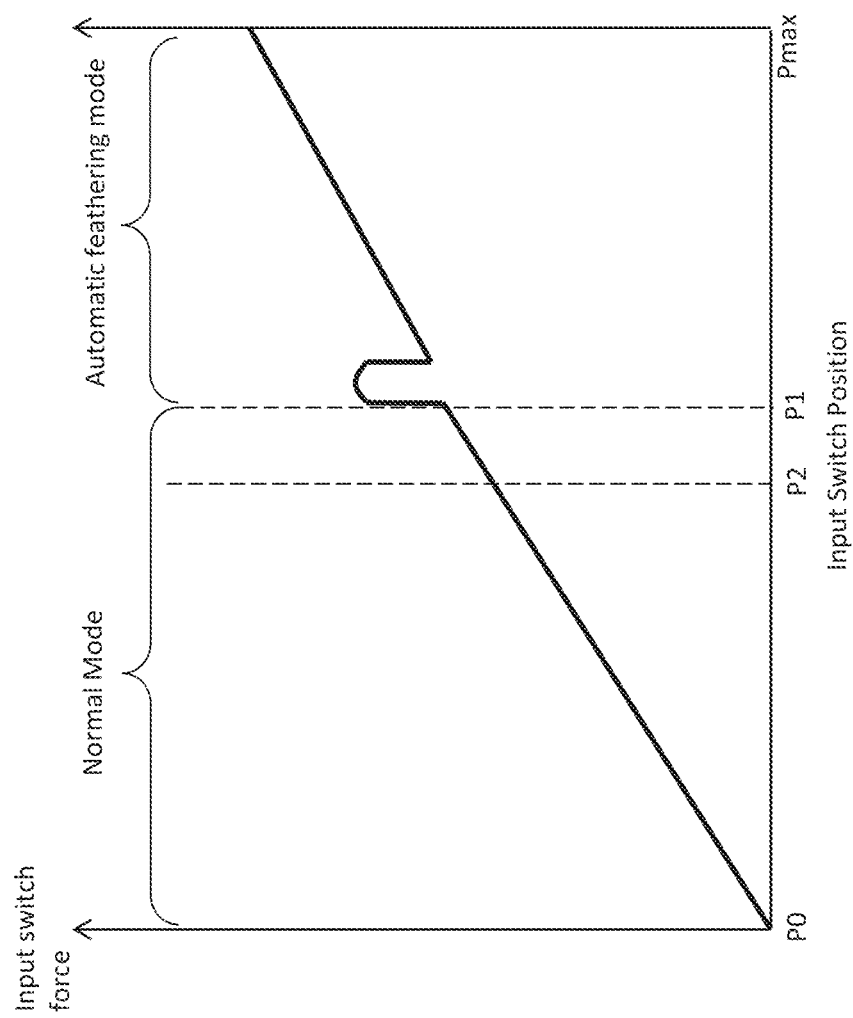
FIG. 7 is a graph showing operation of the first embodiment of the input switch of FIG. 6.

Referring to FIGS. 6 and 7, the embodiment of FIGS. 4 and 5 may be implemented with an embodiment of an input switch 36 that has a detent at the first intermediate position P1 to provide the user with a tactile indication of when the controller will switch from the normal mode to the automatic feathering mode. The input switch 36 include a trigger actuator 82, a trigger body 84 coupled to the trigger actuator 82, and a first spring 86 that biases the trigger body 84 and the trigger actuator 82 toward the deactivated position P0. The trigger body 84 provides a signal to the controller 40 that corresponds to the position P of the rear end 85 of the trigger body 84 so that the controller 40 may provide power to the motor in accordance with the embodiment of FIGS. 4 and 5. The trigger switch 36 further includes a detent 88 received at least partially within a cylinder 90 and biased by a second spring (not shown) located within the cylinder 90 toward and generally perpendicular to the trigger body 84. Coupled to the second spring is a set screw 92 that enables adjustment of the force of the second spring during manufacturing and assembly of the input switch 36.

As the trigger actuator 82 is depressed, the rear end 85 of the trigger body 84 moves in the first subrange of the first range of positions from the deactivated position P0 to the second intermediate position P2, causing the controller to operate in the normal mode with variable power. In this first subrange of positions, the force exerted on the trigger actuator 82 increases proportionally with rearward movement of the trigger body 84 as the first spring 86 is compressed. As the trigger actuator 82 is further depressed, the rear end 85 of the trigger body 84 moves in the second subrange of the first range of positions from the second intermediate position P2 to the first intermediate position P1, causing the controller to operate in the normal mode with constant power. In this second subrange of positions, the force exerted on the trigger actuator 82 further increases proportionally with rearward movement of the trigger body 84 as the first spring 86 is further compressed.

At first intermediate position P1, the rear end 85 of the trigger body 84 engages the detent 88. To depress the trigger actuator 82 beyond the first intermediate position P1, additional force must be applied to the trigger actuator 82 to overcome the force that the second spring 92 exerts against the detent 88. This provides a tactile indication to the user that the controller is switching from the normal mode to the automatic feathering mode. Once the trigger actuator is depressed 82 past this point, the trigger body 84 moves in the second range of positions from the first intermediate position P1 to the fully actuated position Pmax, causing the controller 40 to operate in the automatic feathering mode. In this second range of positions, the force on the trigger actuator 82 continues to increase proportional with rearward movement of the of the trigger body 84 as the first spring 86 is further compressed.

Figure 8:
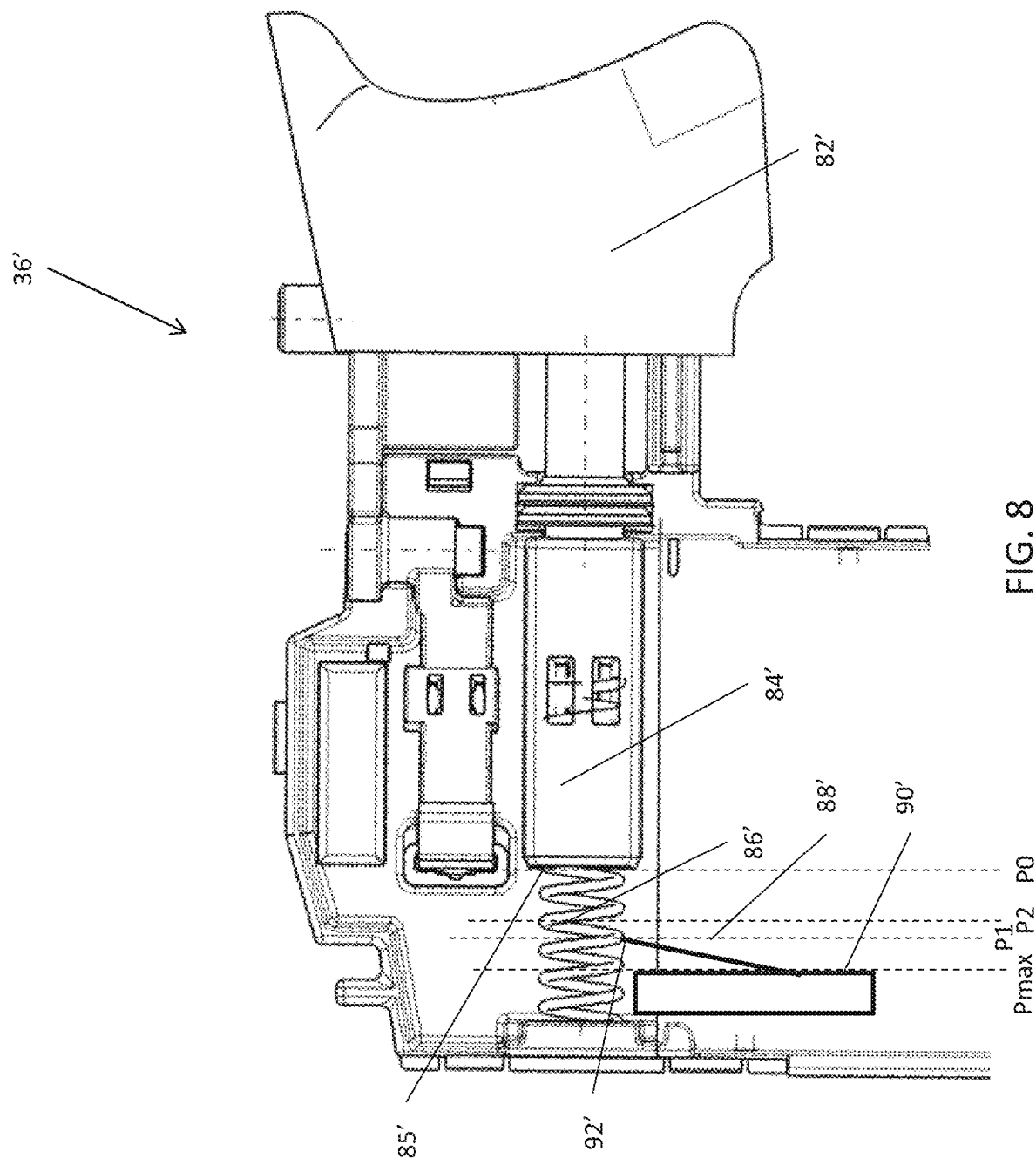
FIG. 8 is a side view of a second embodiment of an input switch for implementing the first embodiment of the normal mode and the automatic feathering mode of FIG. 4.
Figure 9:
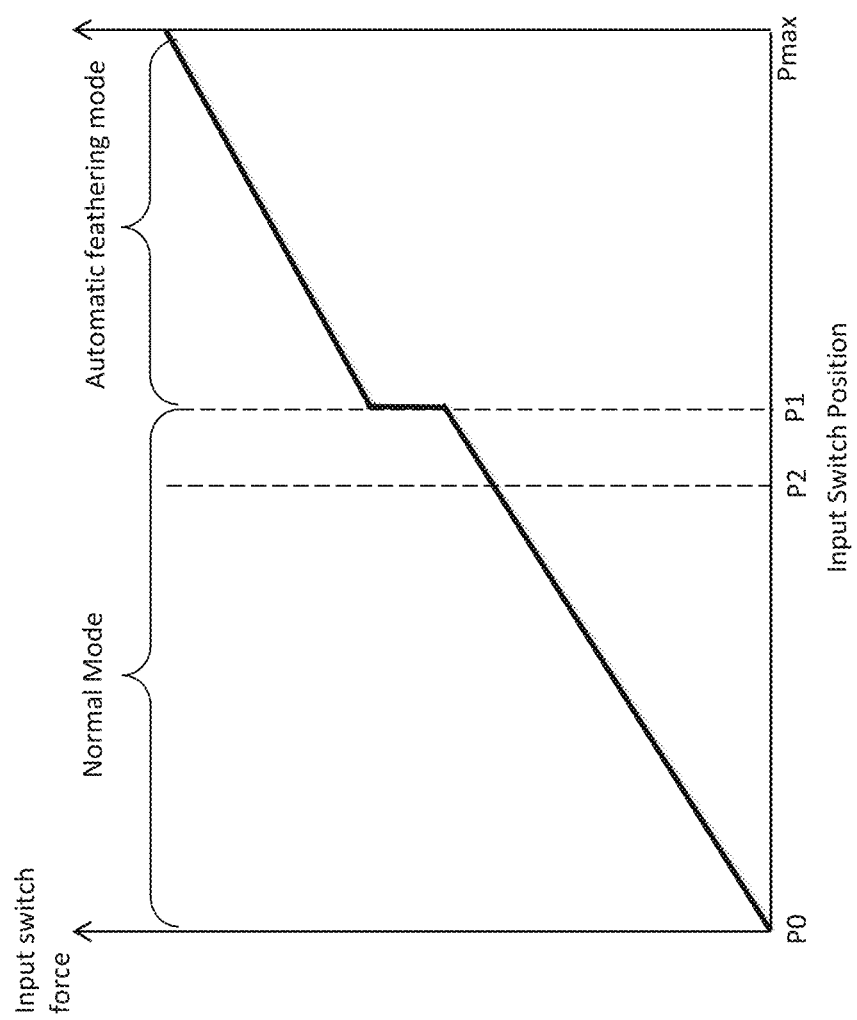
FIG. 9 is a graph showing operation of the second embodiment of the input switch of FIG. 8.

Referring to FIGS. 8 and 9, the embodiment of FIGS. 4 and 5 may be implemented with another embodiment of an input switch 36' that has a lever at the first intermediate position P1 to provide the user with a tactile indication of when the controller will switch from the normal mode to the automatic feathering mode. The input switch 36' include a trigger actuator 82', a trigger body 84' coupled to the trigger actuator 82', and a first spring 86' that biases the trigger body 84' and the trigger actuator 82' toward the deactivated position P0. The trigger body 84' provides a signal to the controller 40 that corresponds to the position P of the rear end 85' of the trigger body 84' so that the controller 40 may provide power to the motor in accordance with the embodiment of FIGS. 4 and 5. The trigger switch 36' further includes a lever 88' coupled to a plunger 90' in a cantilevered manner so that a free end 92' of the lever 88' that is biased toward the trigger body 84'.

As the trigger actuator 82' is depressed, the rear end 85' of the trigger body 84' moves in the first subrange of the first range of positions from the deactivated position P0 to the second intermediate position P2, causing the controller to operate in the normal mode with variable power. In this first subrange of positions, the force exerted on the trigger actuator 82' increases proportionally with rearward movement of the trigger body 84' as the first spring 86' is compressed. As the trigger actuator 82' is further depressed, the rear end 85' of the trigger body 84' moves in the second subrange of the first range of positions from the second intermediate position P2 to the first intermediate position P1, causing the controller to operate in the normal mode with constant power. In this second subrange of positions, the force exerted on the trigger actuator 82' further increases proportionally with rearward movement of the trigger body 84' as the first spring 86' is further compressed.

At first intermediate position P1, the rear end 85' of the trigger body 84' engages the free end 92' of the lever 88'. To depress the trigger actuator 82' beyond the first intermediate position P1, additional force must be applied to the trigger actuator 82' to overcome the additional force that the lever 88' exerts against the trigger body 84'. This provides a tactile indication to the user that the controller is switching from the normal mode to the automatic feathering mode. As the trigger actuator is depressed 82' past this point, the trigger body 84' moves in the second range of positions from the first intermediate position P1 to the fully actuated position Pmax, causing the controller 40 to operate in the automatic feathering mode. In this second range of positions, the force on the trigger actuator 82' continues to increase proportional with rearward movement of the of the trigger body 84', but at a higher amount than in the first range of positions, due to the combined forces exerted on the trigger body 84' and the as the first spring 86'. In an alternative embodiment, lever 88' may be coupled to a bypass electrical switch so that movement of the lever 88' by the trigger body 84' may close the bypass switch to actuate the automatic feathering mode.

Figure 10:
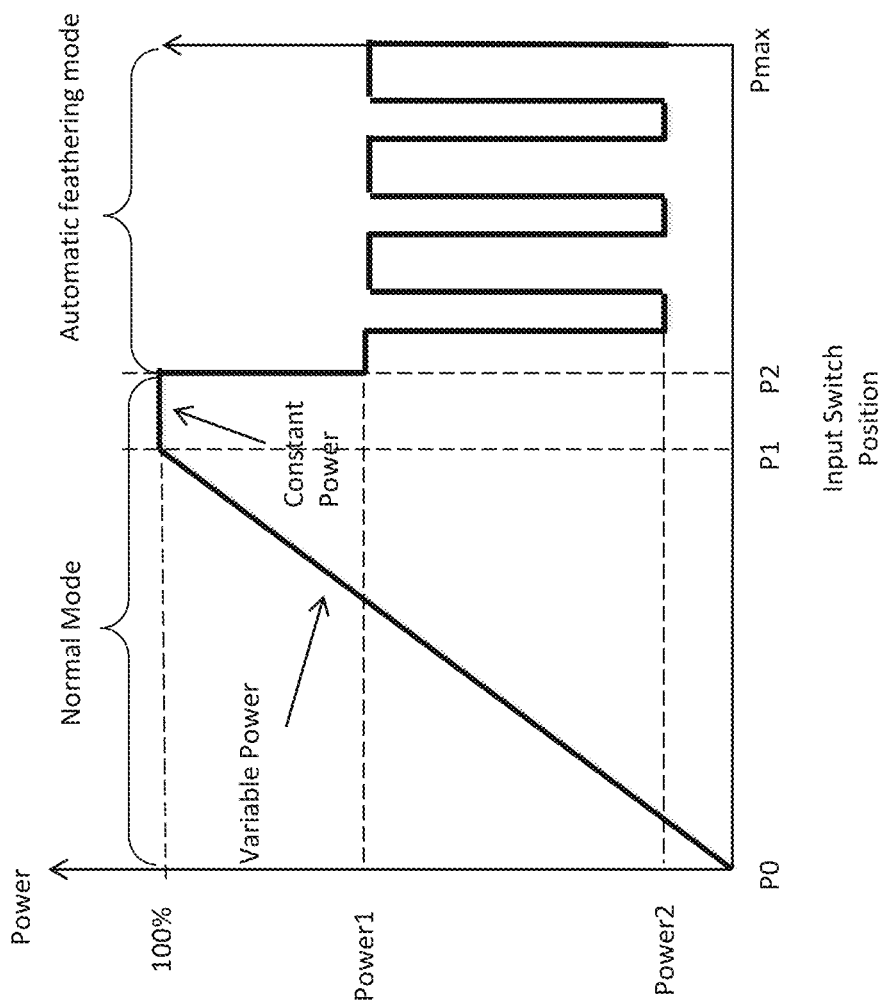
FIG. 10 is a graph showing operation of the power tool in a second embodiment of a normal mode and an automatic feathering mode.

FIG. 10 illustrates an alternative automatic feathering mode to the embodiment of the automatic feathering mode shown in FIG. 4. The embodiment of FIG. 10 differs from the embodiment of FIG. 4, in the operation in the automatic feathering mode when the input switch is actuated in the second range of positions (between the first intermediate position P1 and the fully actuated in position). In this embodiment of the automatic feathering mode, the controller applies to the motor discontinuous power in the form of short pulses of a first intermediate power Power1 that is less than full power interrupted by short pulses of a second intermediate power Power2 that is greater than zero. For example, Power1 may comprise a PWM signal at 50% of the maximum duty cycle and Power2 may comprise a PWM signal at 10% of the maximum duty cycle. The frequency of the pulses is low enough to be perceptible to the user, such as approximately 1 Hz to approximately 100 Hz. This causes the motor to rotate in small increments and simulates feathering the input switch.

Figure 11:
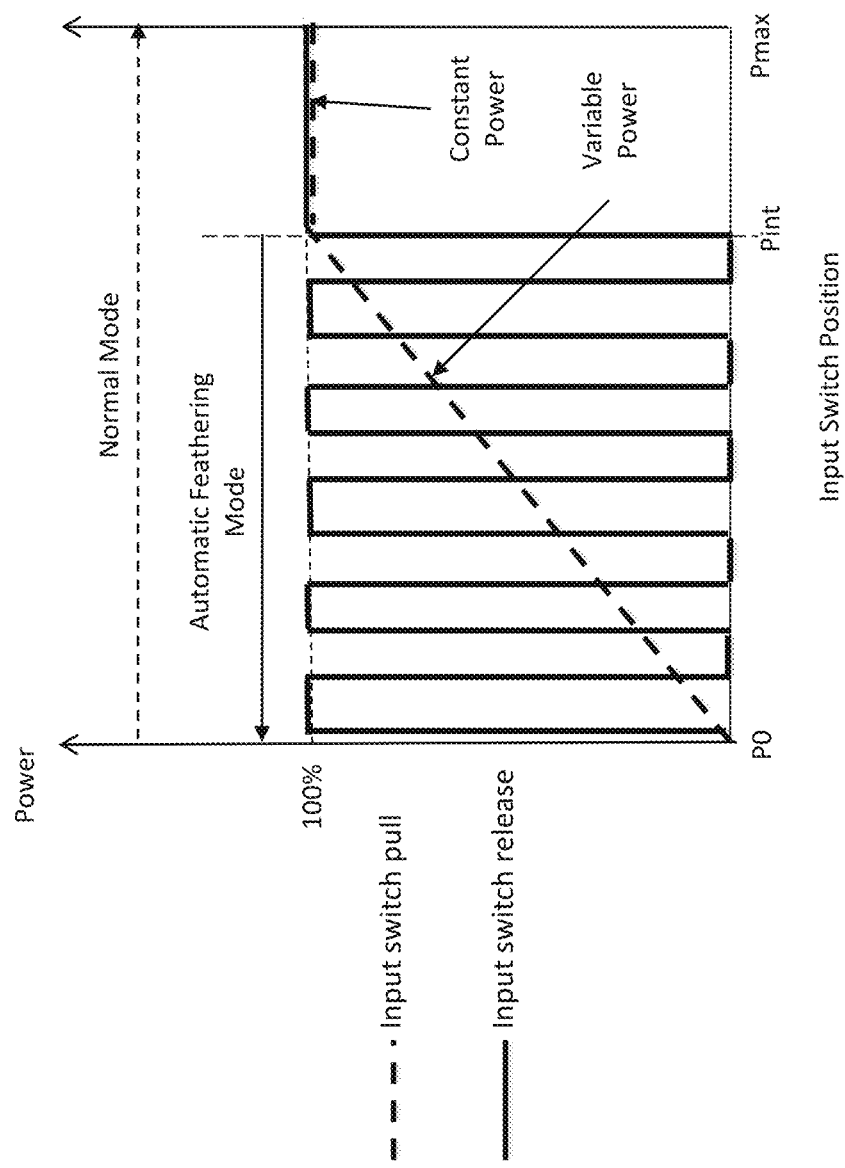
FIG. 11 is a graph showing operation of the power tool in a third embodiment of a normal mode and an automatic feathering mode.

Referring to FIG. 11, in another embodiment, the controller 40 is operable in a normal mode when the input switch 36 is actuated in a first range of positions between a deactivated position P0 and a fully actuated position Pmax, and in an automatic feathering mode when the input switch 36 is actuated in a second range of positions between an intermediate position Pint and the deactivated position P0 only after the input switch 36 has been actuated past the intermediate position Pint and then released back past the intermediate position Pint. In the normal mode, the controller 40 causes continuous electrical power to be delivered to the motor to cause continuous rotation of the motor. The first range of positions P0-Pmax for the normal mode contains two sub-ranges of positions. First, when the input switch is actuated in a first sub-range between the deactivated position P0 and the intermediate position Pint, the amount of continuous power delivered to the motor is proportional to the distance of input switch travel from the deactivated position P0. This can be achieved, for example, by varying the duty cycle of a PWM signal. Second, when the input switch further actuated in the second sub-range between the intermediate position Pint and the fully actuated position Pmax, the amount of continuous power delivered to the motor is constant. For example, the controller 40 may provide full power (e.g., a duty cycle of 100%) to the motor. It should be understood that the normal mode may include only a variable power portion with no full power portion, or may include only a full power portion with no variable power portion.

The controller operates in the automatic feathering mode only if the input switch first is actuated past the intermediate position Pint and then is released back past the intermediate position Pint to operate in the second range of positions between the intermediate position Pint and the deactivated position P0. If, however, the input switch is released before being actuated far enough to move beyond the intermediate position Pint, then, as the input switch is being released the controller continues to operate in the normal mode with motor power proportional to the position of the input switch. In the automatic feathering mode, the controller causes discontinuous pulses of electrical power to be delivered to the motor to cause discontinuous rotation of the motor. For example, in the automatic feathering mode, the controller 40 applies pulses of continuous full power interrupted by pulses of zero power to the motor so that the motor rotates in small increments. As discussed above, the frequency of pulses is low enough to be perceptible to the user, such as approximately 1 Hz to approximately 100 Hz. Alternatively, the discontinuous power could comprise pulses of a first intermediate power interrupted by pulses of a second lower intermediate power, as shown in the embodiment of FIG. 10. It should be understood that the normal mode may include only a variable speed portion with no full power portion, or may include only a full power portion with no variable speed portion. In addition, in the automatic feathering mode, the controller may apply to the motor short pulses of a first intermediate power PWM1 that is less than full power interrupted by short pulses of a second intermediate non-zero power PWM2 to the motor, similar to the embodiment shown in FIG. 10.

Figure 12:
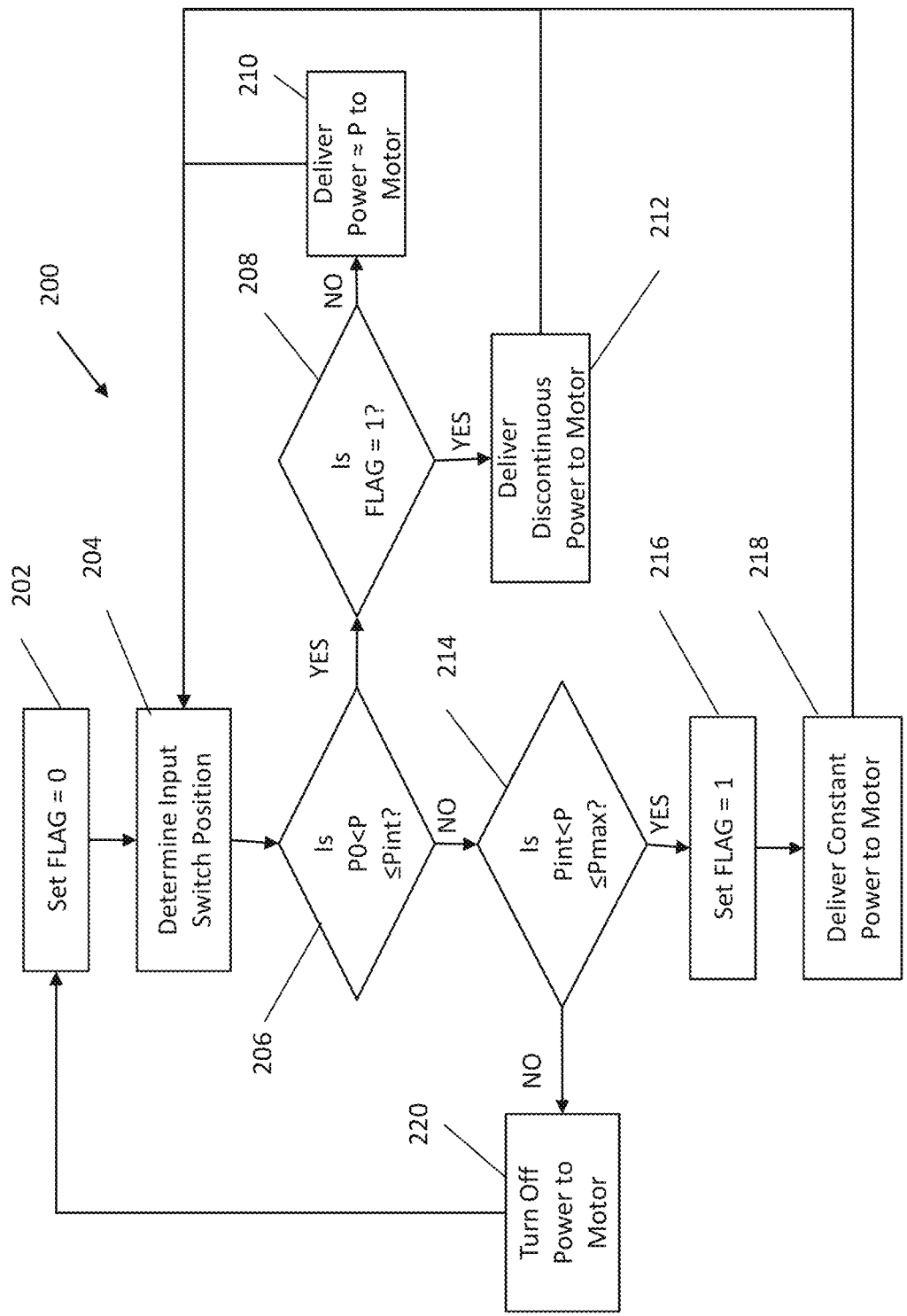
FIG. 12 is flow chart showing operation of the power tool in the third embodiment of the normal mode and the automatic feathering mode of FIG. 10.

FIG. 12 illustrates an exemplary process 200 implemented by the controller to achieve the operation of the embodiment of FIG. 11. At step 202, the controller sets a value for a variable FLAG to be equal to zero (0). The FLAG variable indicates whether the input switch has already been actuated past the intermediate position Pint. A value of zero (0) indicates the input switch has not been actuated beyond the intermediate position Pint in a cycle of trigger actuation from the fully released position. A value of one (1) indicates the input switch has been actuated past the intermediate position Pint during a cycle of trigger actuation from the fully released position. Therefore, prior to the start of an actuation cycle, the value for FLAG is set to zero (0).

At step 204, the controller detects the position P of the input switch. At step 206, the controller determines whether the position P of the input switch is within the first subrange of the first range of positions for operation in the normal mode with variable power (i.e., between the deactivated position P0 and the intermediate position Pint). If the input switch is within the first range, then at step 208, the controller determines whether the value for FLAG value is equal to one (1). If the value for FLAG does not equal one (1), this indicates that the value for FLAG equals zero (0) and the input switch has not been previously actuated past the intermediate position Pint during this cycle of operation. In this case, at step 210, the controller delivers power to the motor in an amount proportional to the position P of the input switch from the deactivated position, and then returns to step 204 to detect the input switch position.

If, at step 206, the controller determines that the position P of the input switch is not in the first subrange of the first range of positions (i.e., is not between the deactivated position P0 and the intermediate position Pint), then at step 214, the controller determines whether the input switch is in the second subrange of the first range of positions (i.e., between the intermediate position Pint and the fully actuated position Pmax. If so, then at step 216, the controller sets the value of FLAG=1 to indicate that the input switch has been actuated past the intermediate position Pint during this cycle of operation. Next, at step 218, the controller delivers constant power to the motor (e.g., by delivering a PWM signal with a 100% duty cycle), and then returns to step 204 to detect the input switch position. If, at step 214, the controller determines that the position P of the input switch is also within the second range, this means that the input switch has been fully released or that there is an error. In either case, at step 220 the controller turns off power to the motor, and returns to the beginning of the process at step 202 to reset the value of FLAG=0.

If, at step 208, the value for FLAG equals one (1), this indicates that the input switch has been previously been depressed past the intermediate position Pint, has been released back past the intermediate position Pint, and is within the second range of positions Pint-P0. In this case, at step 212, the controller operates in the automatic feathering mode and delivers discontinuous power to the motor to cause discontinuous rotation of motor (e.g., by delivering pulses of maximum power interrupted by pulses of zero power), and then returns to step 204 to detect the input switch position. The embodiment of FIGS. 11 and 12 may be implemented using the input switch 36 with a detent as disclosed in the embodiment of FIGS. 6 and 7 or with the input switch 36' with a lever as disclosed in the embodiment of FIG. 8.

Numerous modifications may be made to the exemplary implementations described above. For example, there may be a second switch separate from the input switch that activates the automatic feathering mode. The rate of discontinuous power and the amount of power delivered to the motor during the automatic feathering mode may be varied, either automatically or by a user (for example, by varying the width of the pulses, the frequency of the pulses, and the amplitude of the pulses). In some embodiments the rate and amount of discontinuous power may be varied within an on period of the automatic feathering mode so that the maximum power, the minimum power, and the frequency of the pulses vary while in the automatic feathering mode. Further, during the off times between pulses in the automatic feathering mode, the control unit may cause active braking of the motor or may run the motor in a reverse direction. The automatic feathering mode may be activated for a limited period of time regardless of whether the input switch is still actuated or where the input switch is in the range of switches. The tool may provide another indication of when the automatic feathering mode is being activated such as by flashing a light, making an audible sound, or providing vibrating haptic feedback. The tool may be configured to actuate the automatic feathering mode when the controller senses that the user has started to manually feather the trigger. These and other implementations are within the scope of the following claims.

What is claimed is:

1. A method of operating a power tool coupled to a source of electric power and having a motor, a control unit, and an input switch, the method comprising:
   determining, in the control unit, a position of the input switch that is moveable between a preset fully deactivated position and a preset fully actuated position;
   delivering continuous electric power to the motor when the determined position of the input switch is within a first range of positions between a first preset position and a second preset position, the continuous electric power causing continuous rotation of the motor; and
   delivering discontinuous electric power to the motor when the determined position of the input switch is within a second range of positions between a third preset position and a fourth preset position, the second range of positions being different from the first range of positions, the discontinuous power causing discontinuous rotation of the motor to simulate feathering the input switch.

2. The method of claim 1, wherein the discontinuous electric power comprises pulses of electrical power with a frequency low enough to be perceptible to a user.

3. The method of claim 2, wherein the pulses of electric power comprise pulses of a first power interrupted by pulses of a second power that is different than the first power.

4. The method of claim 1, wherein the second preset position is a preset intermediate position between the preset fully deactivated position and the preset fully actuated position.

5. The method of claim 4, wherein the first preset position is the preset fully deactivated position.

6. The method of claim 4, wherein the third preset position is approximately the same as the second preset position.

7. The method of claim 6, wherein the fourth preset position is the preset fully actuated position.

8. The method of claim 1, wherein
the first range of positions includes a first sub-range of positions between the first preset position and an intermediate position that is between the first preset position and the second preset position and a second sub-range of positions between the intermediate position and the second preset position, and
discontinuous electric power is delivered to the motor when the input switch is in the second range of positions after detecting the input switch has been in the second sub-range of positions.

9. The method of claim 8, wherein continuous electrical power is delivered to the motor in the first sub-range of positions before detecting the input switch is in the second sub-range of positions.

10. The method of claim 9, wherein the first preset position is the preset fully deactivated position, the second preset position is the preset full actuated position, the third preset position is the intermediate position, and the fourth preset position is the preset fully deactivated position.

11. A power tool comprising:
a housing;
a motor disposed in the housing;
an output spindle configured to be driven by the motor;
an input switch moveable between a preset fully deactivated position and a preset fully actuated position; and
a control unit configured to determine a position of the input switch and control power being delivered to the motor in: (a) a normal mode where the control unit causes continuous electric power to be delivered to the motor during actuation of the input switch in a first range of positions between a first preset position and a second preset position, the continuous electric power causing continuous rotation of the motor; and (b) a feathering mode where the controller causes discontinuous electric power to be delivered to the motor during actuation of the input switch in a second range of positions between a third preset position and a fourth preset position, the second range of positions being different from the first range of positions, the discontinuous power causing discontinuous rotation of the motor to simulate feathering the input switch.

12. The power tool of claim 11, wherein the discontinuous electric power comprises pulses of electrical power with a frequency low enough to be perceptible to a user.

13. The power tool of claim 12, wherein the pulses of electric power comprise pulses of a first power interrupted by pulses of a second power that is different than the first power.

14. The power tool of claim 11, wherein the second preset position is a preset intermediate position between the preset fully deactivated position and the preset fully actuated position.

15. The power tool of claim 14, wherein the first preset position is the preset fully deactivated position.

16. The power tool of claim 14, wherein the third preset position is approximately the same as the second preset position.

17. The power tool of claim 16, wherein the fourth preset position is the preset fully actuated position.

18. The power tool of claim 11, wherein
the first range of positions includes a first sub-range of positions between the first preset position and an intermediate position that is between the first preset position and the second preset position and a second sub-range of positions between the intermediate position and the second preset position, and
the control unit causes the discontinuous electric power to be delivered to the motor during actuation of the input switch in the second range of positions after the control unit detects that the input switch has been actuated in the second sub-range of positions.

19. The power tool of claim 18, wherein the control unit causes the continuous electric power to be delivered to the motor in the normal mode during actuation of the input switch in the first sub-range of positions before the control unit detects that the input switch has been actuated in the second sub-range of positions.

20. The power tool of claim 19, wherein the first preset position is the preset fully deactivated position, the second preset position is the preset fully actuated position, the third preset position is the intermediate position, and the fourth preset position is the preset fully deactivated position.

* * * * *